United States Patent [19]

Chauvel et al.

[11] 4,078,018

[45] Mar. 7, 1978

[54] GRAFT POLYMERS AND COMPOSITIONS OF HIGH IMPACT STRENGTH

[75] Inventors: Bernard Chauvel, Ermont; Jean-Claude Daniel, Fontenay-sous-Bois, both of France

[73] Assignee: Rhone-Progil, Courbevoie, France

[21] Appl. No.: 487,218

[22] Filed: Jul. 10, 1974

[30] Foreign Application Priority Data

Jul. 11, 1973 France .............................. 73 25394

[51] Int. Cl.$^2$ ........................................... C08F 279/06
[52] U.S. Cl. ............................ 260/880 R; 260/876 R
[58] Field of Search ........................ 260/876 R, 880 R

[56] References Cited

U.S. PATENT DOCUMENTS

| | | | |
|---|---|---|---|
| 3,029,222 | 4/1962 | Briskin | 260/880 R |
| 3,287,443 | 11/1966 | Saito | 260/876 R |
| 3,316,327 | 4/1967 | Baer | 260/876 R |
| 3,444,269 | 5/1969 | Beer | 260/876 R |
| 3,636,138 | 1/1972 | Beer | 260/876 R |
| 3,644,249 | 2/1972 | Ide | 260/876 R |
| 3,644,250 | 2/1972 | Ide | 260/876 R |

*Primary Examiner*—Paul R. Michl
*Attorney, Agent, or Firm*—McDougall, Hersh & Scott

[57] ABSTRACT

Graft polymers based upon butadiene, alkyl acrylate, methyl methacrylate and styrene, for the improvement of the impact strength of homo- or co-polymers of vinyl chloride. Use is made of a backbone polymer formed of a butadiene-alkyl acrylate copolymer which is agglomerated and grafted with methyl methacrylate, styrene and possibly a cross-linking monomer. The composition, mixtures of homo- or co-polymers of vinyl chloride and graft polymers are usable for the manufacture of plates, bottles, wrapping sheets and bottles for packaging liquids.

13 Claims, No Drawings

GRAFT POLYMERS AND COMPOSITIONS OF HIGH IMPACT STRENGTH

The present invention relates to grafted polymers based upon butadiene, alkyl acrylate, methyl methacrylate and styrene. The invention also relates to rigid thermoplastic compositions of high impact strength, formed of homopolymers or copolymers of vinyl chloride and the said grafted polymers.

It is known to prepare polymers by grafting styrene, methyl methacrylate and possibly acrylonitrile upon backbone polymers of polybutadiene or copolymers of butadiene with other monomers, such as styrene and acrylonitrile.

These grafted polymers, mixed with homopolymers or copolymers of vinyl chloride, improve the impact strength of the said homopolymers or copolymers and permit articles of superior impact strength to be obtained. However these articles are not transparent and display an appreciable opalescence.

In order simultaneously to obtain impact-resistant and transparent articles, it has been proposed to use grafted polymers of the same composition as previously, but where the backbone is grafted successively by methyl methacrylate, a styrene and methyl methacrylate, described in French Pat. No. 1,566,367. However the impact strength of the articles obtained with these grafted polymers is sometimes inadequate.

It has also been proposed, before grafting, to agglomerate the backbone polymers constituted of polybutadiene or copolymers of butadiene with styrene or acrylonitrile, but the agglomeration does not take place in an orderly manner which, in the course of grafting, causes the formation of crusts and leads to nonreproducible grafted polymers, the reinforcing properties of which are hardly superior to those of grafted polymers prepared from the same backbone polymers without agglomeration.

It is the object of this invention to prepare, without any difficulty and in a reproducible manner, grafted polymers of particular structure possessing exceptional reinforcement qualities, the mixtures of which with vinyl chloride homopolymers or copolymers are easy to utilize for the manufacture of transparent articles of very high impact strength.

The grafted polymers, according to the invention, are constituted of 10 to 70% by weight of backbone polymer and 90 to 30% by weight of grafts formed from 20 to 80% by weight of methyl methacrylate, 80 to 20% by weight of styrene and 0 to 5% by weight of at least one cross-linking monomer and are characterized in that the backbone polymer is formed of a butadiene-alkyl acrylate copolymer the alkyl group of which contains 1 to 10 atoms of carbon and in which the acrylate represents 5 to 50% by weight, and in that 10 to 70% by weight of the backbone polymer are agglomerated into particles having a diameter between 0.1 and 1 micron.

Among the alkyl acrylates entering into the composition of the backbone polymer, one may cite: methyl, ethyl, ethylhexyl acrylates and more particularly butyl acrylate.

The proportions of acrylate in the backbone polymer are between 5 and 50%. A proportion below 5% does not appreciably modify the properties of the grafted polymer and a proportion higher than 50% gives no improvement of the impact strength of the compositions obtained with such grafted polymers; moreover the articles formed from these compositions are opalescent and even opaque.

The backbone copolymer is prepared in a manner known per se, by polymerization in emulsion in the presence of at least one free radical initiator and at least one emulsifier, at a temperature between 0° and 100° C. Thus one obtains a copolymer latex the particle size of which is less than 0.15 micron and preferably between 0.05 and 0.1 microns.

The backbone polymer can present varied degrees of cross-linkage, which can be regulated according to the product which it is desired to obtain. Thus, in order to have a low degree of cross-linkage, it is possible to add a chain limiter, such as an alkyl mercaptan, in proportions between 0.01 and 0.5% by weight in relation to the monomers. On the other hand, a backbone polymer having a high degree of cross-linkage can be obtained by addition, at the beginning or in the course of the polymerization, of one or more cross-linking monomers, the proportion of which does not exceed 5% by weight in relation to the monomers. Among these cross-linking monomers one may cite: divinyl benzenes, dimethacrylates and diacrylates of mono- and polyethylene glycol, divinyl sulphide, divinyl ether, vinyl acrylate, vinyl methacrylte, trivinyl benzene and trimethylol propane trimethacrylate.

After copolymerization, the small quantity of unpolymerized residual monomers is eliminated and one obtains a latex of the backbone copolymer which possesses a composition corresponding substantially to the proportions of the monomers utilized.

The latex thus obtained is then agglomerated.

This agglomeration operation consists in enlarging a certain quantity of particles by processes different from polymerization. Among the known processes one may cite: the application of high pressures, the action of freezing-thawing, the modification of the pH value, the addition of colloids such as polyvinyl alcohols, polyvinyl methyl ether, polyoxyethylenes in proportions between 0.001 and 2% by weight of the copolymer and preferably between 0.002 and 0.5%.

This agglomeration operation is carried out either upon the backbone polymer latex, before grafting, or in the course of the polymerization of the backbone polymer, for example as described in our copending application filed concurrently herewith and entitled "Process for Producing Rubber Polymer Latices with Large Particles."

According to the invention, 10 to 70% and preferably 10 to 50% by weight of the particles are agglomerated and the size of the particles obtained is between 0.1 and 1 micron.

In fact, an agglomerated particle proportion below 10% does not permit a grafted product having an adequate reinforcing power to be obtained, whereas an agglomerated particle proportion higher than 70% causes the formation of crusts in grafting, does not increase the reinforcing power of the grafted polymer, and gives opalescent transformed articles.

Likewise a particle size below 0.1 micron and a particle size above 1 micron respectively present the same drawbacks.

The grafting of methyl methacrylate, styrene and possibly cross-linking monomer onto the backbone polymer is effected in aqueous emulsion by all known processes, such as grafting of the mixture of monomers, successive grafting of the methyl methacrylate and then of the styrene, and more particularly successive grafting in the order of methyl methacrylate and cross-linking monomer, then styrene and finally methyl methacrylate possibly with a cross-linking monomer, according to the process in accordance with French Pat. No. 1,566,367.

In the grafting operation, a part of the methyl methacrylate, less than 50% by weight, can be replaced by a comonomer represented by acrylonitrile, methacrylonitrile, an alkyl acrylate the alkyl group of which contains 1 to 10 atoms of carbon, or an alkyl methacrylate the alkyl group of which contains 2 to 10 atoms of carbon.

Likewise a part of the styrene, less than 50% by weight, can be replaced by a vinyl-aromatic monomer, such as α-methyl styrene.

The grafted polymer obtained can be used directly in the form of a latex, or be separated by any known processes, such as atomization, coagulation by addition of calcium chloride, alum or mineral acid, followed by filtration under vacuum, washing, and drying.

The said grafted polymer is used for the preparation of the compositions based upon vinyl chloride homopolymers or copolymers to which the invention relates, containing 2 to 50% and preferably 5 to 20% by weight of grafted polymer. These compositions possess a great facility for transformation by kneading, extrusion, and vacuum forming, and permit articles having an exceptional impact strength and perfect transparency to be obtained.

By vinyl chloride copolymers, there are meant all copolymers including at least 50% by weight of vinyl chloride and another monomer selected from the group formed of the vinylic ethers and esters, such as vinyl acetate, alkyl acrylates and methacrylates, fumaric, maleic, chlorofumaric, chloromaleic esters, vinylidene chloride, vinyl pyridine, ethylene and propylene.

The polymers and copolymers of vinyl chloride can be obtained by any known process: polymerization in emulsion, in fine suspension and preferably in mass or in suspension, which give polymers of maximum transparency.

The compositions are obtained by mixing the vinyl chloride homopolymer or copolymer and the grafted polymer, in the form of powder or latex. In the latter case, the mixture is then treated by atomization or by coagulation, followed by washing and drying.

The compositions based upon vinyl chloride homopolymers or copolymers and grafted polymers are especially suitable for the manufacture of plates, bottles, sheets for wrapping especially of foodstuffs, and bottles for the packaging of liquids, such as water, wine, oil, and dairy products.

The following examples for carrying out the invention are given by way of illustration and not of limitation, all quantities being expressed in parts by weight.

In these examples:
the turbidity of the latices is determined according to the method, as described in "Encyclopedia of Chemical Technology" of Kirk Othmer, 2nd edition, volume 20, pages 738 to 747, with a Jean & Constant spectrophotometer, for a concentration of 1 g./l. and a wave length of 6900 A;

the particle size and the granulometric distribution are determined by examination of the latex with an electron microscope and counting of the particles, after treatment by bromine vapour;

the degree of cross-linkage is expressed by the gel rate and the index of swelling of the polymer in benzene, the degree of cross-linkage being the greater as the gel rate is greater and as the swelling index is smaller. These two characteristics are determined on the product obtained after coagulation of the latex and drying.

A weight $p$ of sample is placed in a basket of weight $T$ which is plunged into a weighing vessel containing 30 cc. of benzene and kept for 24 hours in darkness at 20° C. The basket with the sample is then placed in a desiccator saturated with benzene vapour, then weighed. The weight $p_1$ is obtained.

10 ccs. of the benzene solution are evaporated; the weight of the dry extract is $p_2$.

The gel rate is given by the formula $$100 [1 - (3 p_2/p_1)].$$

The swelling index is given by the formula $$(p_1 - T)/(p - 3p_2).$$

EXAMPLE 1

Preparation of the backbone polymer

Into a stainless steel autoclave there are introduced:
80 parts of butadiene,
20 parts of butyl acrylate,
1 part of potassium chloride,
120 parts of deionized water,
3 parts of potassium laurate,
0.2 part of N-dodecyl mercaptan,
0.3 part of potassium persulphate.

The reaction mixture is heated to 75° C. and kept at this temperature for 8 hours. The transformation rate is then 95%.

The turbidity of the latex is $610 \times 10^{-3}$ cm.$^{-1}$

The diameter of the particles is between 0.05 and 0.1 micron.

The gel rate is 95%, the swelling index is 20.

Agglomeration

To the latex obtained, kept under agitation, there is added 0.006 part of polyethylene glycol having a molecular mass of 20,000, in aqueous solution at 0.5 g./l. The mixture is heated to 80° C. for 5 min. and then cooled. Then the same measurements as before are effected, and one obtains:
a turbidity of $1150 \times 10^{-3}$ cm.$^{-1}$,
a particle diameter between 0.1 and 1 micron with the following granulometric distribution expressed in weight:
60% $\leq$ 0.1 micron,
80% $\leq$ 0.25 micron,
90% $\leq$ 0.50 micron,
100% $\leq$ 1 micron.

Preparation of the grafted polymer

Into a stainless steel autoclave there are introduced:
50 parts of backbone polymer (in the form of agglomerated latex obtained previously),
170 parts of deionized water.

The reaction mixture is heated to 80° C. with agitation and kept at this temperature throughout the operation.

One then introduces 0.5 part of potassium persulphate dissolved in 10 parts of deionized water, then 25 parts of methyl methacrylate are continuously introduced over two hours.

The mixture is left under agitation for two hours, then over 2 hours there are introduced 25 parts of styrene, and agitation is again effected for 2 hours.

After cooling, one adds to the latex a solution of 1.47 part of ditertiobutyl paracresol in 2.94 parts of dichloroethane. The latex obtained is then coagulated by addition of 3 times the theoretical quantity, calculated from the quantity of emulsifier present in the latex, of a mixture of hydrochloric acid and sodium chloride in 10% aqueous solution. The particles are filtered under vacuum, washed and dried.

Application of the grafted polymer 100 parts of a polyvinyl chloride of viscosity index 80, obtained by mass polymerization, 10 parts of the grafted polymer prepared as above and one part of a dibutyltin thioester are mixed. The mixture is then kneaded at 150° C. and the sheet obtained is compression moulded into plates at 175° C., from which plates test specimens are cut. On these test specimens, the transparency is monitored and the impact strength is measured by Charpy's method (hammer of 150 kg., impact velocity 3.8 m./s.) at 20° C. on 20 notched test specimens. The result is expressed in kg./sq.cm. (number of test specimens possessing this strength).

The same determinations are effected upon the initial polyvinylchloride not containing any grafted polymer.

The initial polyvinylchloride and the reinforced polyvinylchloride possess the same transparency.

The impact strength of the initial polyvinylchloride is 2 kg./sq.cm. (20 test specimens), that of the reinforced polyvinylchloride is:

130 kg./sq.cm. (4 test specimens),
80 kg./sq.cm. (4 test specimens),
40 kg./sq.cm. (11 test specimens),
3 kg./sq.cm. (1 test specimen).

The same mixture of polyvinylchloride and grafted polymer according to the invention is used to manufacture bottles intended for the packaging of liquids. The bottles have a transparency identical with that of bottles obtained with unreinforced polyvinylchloride, but with a superior impact strength.

EXAMPLE 2

Preparation of the backbone polymer

Identical with Example 1.

Agglomeration

Identical with Example 1.

Preparation of the grafted polymer

Into a stainless steel autoclave, there are introduced:
50 parts of the backbone polymer in the form of the obtained agglomerated latex,
170 parts of deionized water.

The reaction mixture is heated to 60° C. with agitation and kept at this temperature throughout the operation. There are continuously introduced 0.075 part of sodium formaldehyde sulphoxylate dissolved in one part of deionized water and 12.5 parts of methyl methacrylate containing 0.147 part of di-isopropyl benzene hydroperoxide and 0.125 part of diethylene glycol dimethacrylate. After 6 hours, the introduction is completed.

The mixture is left for one hour with agitation, then there are introduced 25 parts of styrene containing 20 g. of di-isopropyl benzene hydroperoxide over a period of 3 hours.

Again the mixture is left for one hour, then in two hours there are added 12.5 parts of methyl methacrylate containing 0.147 part of di-isopropyl benzene hydroperoxide, and again agitation is effected for 1 hour.

The latex obtained is then treated and coagulated as in Example 1.

Application of the grafted polymer

Operation is as in Example 1.

The transparency of the plates and bottles is identical with that of the initial polyvinylchloride.

The impact resistance is:

130 kg./sq.cm. (7 test specimens),
85 kg./sq.cm. (9 test specimens),
40 kg./sq.cm. (4 test specimens).

By way of comparison, in order better to illustrate the interest of the grafted polymers and their compositions, various experiments are effected.

EXPERIMENT A

Example 2 is repeated, but without agglomerating the backbone latex.

The transparency of the plates and bottles is unchanged, but the impact strength is clearly inferior:

110 kg./sq.cm. (1 test specimen),
80 kg./sq.cm. (1 test specimen),
60 kg./sq.cm. (2 test specimens),
20 kg./sq.cm. (14 test specimens),
3 kg./sq.cm. (2 test specimens).

This experiment shows the importance of the agglomeration upon the reinforcing properties of grafted polymers.

EXPERIMENT B

A backbone polymer is prepared, as in Example 1, but the agglomeration is effected with 0.02 part of polyethylene glycol in place of 0.006.

The latex obtained presents:

a turbidity of $5900 \times 10^{-3}$ cm.$^{-1}$,
a particle diameter between 0.1 and 5 microns,
the following granulometric distribution:
  20% $\leq$ 0.1 micron,
  40% $\leq$ 0.25 micron,
  60% $\leq$ 0.50 micron,
  80% $\leq$ 1 micron.

From this latex, a grafted polymer is prepared in the same manner as in Example 2.

An encrustation of the autoclave is observed representing 5 to 6% by weight in relation to the sum of backbone polymer + graft monomers.

Application gives opalescent plates and bottles.

The impact strength is:

130 kg./sq.cm. (6 test specimens),
85 kg./sq. cm. (7 test specimens),
40 kg./sq.cm. (4 test specimens),
4 kg./sq.cm. (3 test specimens).

This experiment shows that when agglomerated particles of more than 1 micron are formed, the impact strength is not increased and that furthermore the products are no longer transparent.

EXPERIMENT C

Preparation of the backbone polymer

Operation is as in Example 2, but the butyl acrylate is replaced by styrene. The reaction lasts 12 hours. The transformation rate is 96%.

The turbidity is $580 \times 10^{-3}$ cm.$^{-1}$.
The particle diameter is between 0.05 and 0.1 micron.
The gel rate is 93%, the swelling index 18.

Preparation of the grafted polymer

Identical with Example 2.
There is no encrustation of the reactor.

Application of the grafted polymer

Operation as in Example 2.
the transparency of the plates and bottles is identical with that of polyvinylchloride without reinforcing polymer.
The impact strength is:
20 kg./sq.cm. (4 test specimens),
12 kg./sq.cm. (9 test specimens),
5 kg./sq.cm. (7 test specimens).

If this experiment is compared with Experiment A, it is noted that the use of alkyl acrylate appreciably improves the impact strength.

EXPERIMENT D

Experiment C is repeated, the backbone polymer being agglomerated as in Example 2.
After agglomeration one obtains:
a turbidity of $4500 \times 10^{-3}$ cm.$^{-1}$,
the particle diameter is between 0.1 and 10 microns,
the agglomerates being constituted essentially by large packs of particles,
the granulometric distribution is as follows:
 20% $\leq$ 0.1 micron,
 20% $\leq$ 0.25 micron,
 30% $\leq$ 0.50 micron,
 40% $\leq$ 1 micron.

In the course of grafting, crusts are produced which represent about 11% by weight of the total of backbone polymer + graft monomers.

Application gives opalescent plates and bottles.
The impact strength is:
30 kg./sq.cm. (4 test specimens),
18 kg./sq.cm. (8 test specimens),
7 kg./sq.cm. (5 test specimens),
3 kg./sq.cm. (3 test specimens).

This experiment shows that the agglomeration of a butadiene-styrene backbone polymer involves grafting difficulties and gives a grafted polymer the reinforcing power of which is greatly inferior to that of a grafted polymer obtained in accordance with Example 2.

We claim:

1. Grafted polymers constituted of:
   10 to 70% by weight backbone polymer,
   which is a copolymer consisting of a butadiene-alkyl acrylate in which the alkyl group contains 1-10 carbon atoms and in which the acrylate represents 5 to 50% by weight of the backbone polymer, and the backbone polymer is agglomerated into particles of 0.1 to 1 micron before grafting, and
   90 to 30% by weight of grafts, in which the grafts are formed of:
   20 to 80% by weight of an acrylic monomer selected from the group consisting of acrylic or methacrylic derivatives at least 50% of which is methyl methacrylate, and
   80 to 20% by weight of a styrene monomer, selected from the group consisting of styrene and vinyl aromatic monomer, at least 50% of which is styrene, and
   0 to 5% by weight of at least one cross-linking monomer,
   and in which the acrylic monomer and styrene monomer are successively grafted onto the backbone polymer in aqueous emulsion.

2. Grafted polymers according to claim 1, characterized in that the alkyl acrylate is represented by the acrylates of the group consisting of methyl, ethyl, ethylhexyl and butyl.

3. Grafted polymers according to claim 1, characterized in that the backbone polymer is cross-linked.

4. Polymers according to claim 1, characterized in that the acrylic or methacrylic derivative is selected from the group consisting of acrylonitrile, methacrylonitrile, an alkyl acrylate the alkyl group of which contains 1 to 10 atoms of carbon, and an alkyl methacrylate the alkyl group of which contains 2 to 10 atoms of carbon.

5. Polymers according to claim 1, characterized in that the vinyl-aromatic monomer is represented by α-methyl styrene.

6. Process for the preparation of the grafted polymers of claim 1, characterized in that the backbone polymer is prepared by polymerization of butadiene and alkyl acrylate in aqueous emulsion, in that it is agglomerated, then grafted successively with the acrylate monomer and styrene monomer, and cross-linking monomer when present.

7. Process according to claim 6, characterized in that the polymerization of the backbone polymer is effected in the presence of 0.01 to 0.5% by weight in relation to the monomers of a chain limiter.

8. Process according to claim 6, characterized in that the polymerization of the backbone polymer is effected in the presence of at least one cross-linking monomer, in a proportion not exceeding 5% by weight of the monomers.

9. Process according to claim 6, characterized in that the size of the particles of the backbone polymer before agglomeration is less than 0.15 micron.

10. Process according to claim 6, characterized in that the agglomeration of the backbone polymer is effected in the course of polymerization.

11. Impact-resistant compositions in which the polymer components consist essentially of vinyl chloride homopolymers or copolymers, and 2 to 50% by weight of grafted polymers of claim 1.

12. Process for the preparation of the compositions of claim 11, characterized in that a vinyl chloride homopolymer or copolymer is mixed with a grafted polymer of claim 1 in the form of powder or latex.

13. Transparent and impact-resistant articles obtained by transformation of the compositions of claim 11.

* * * * *